UNITED STATES PATENT OFFICE.

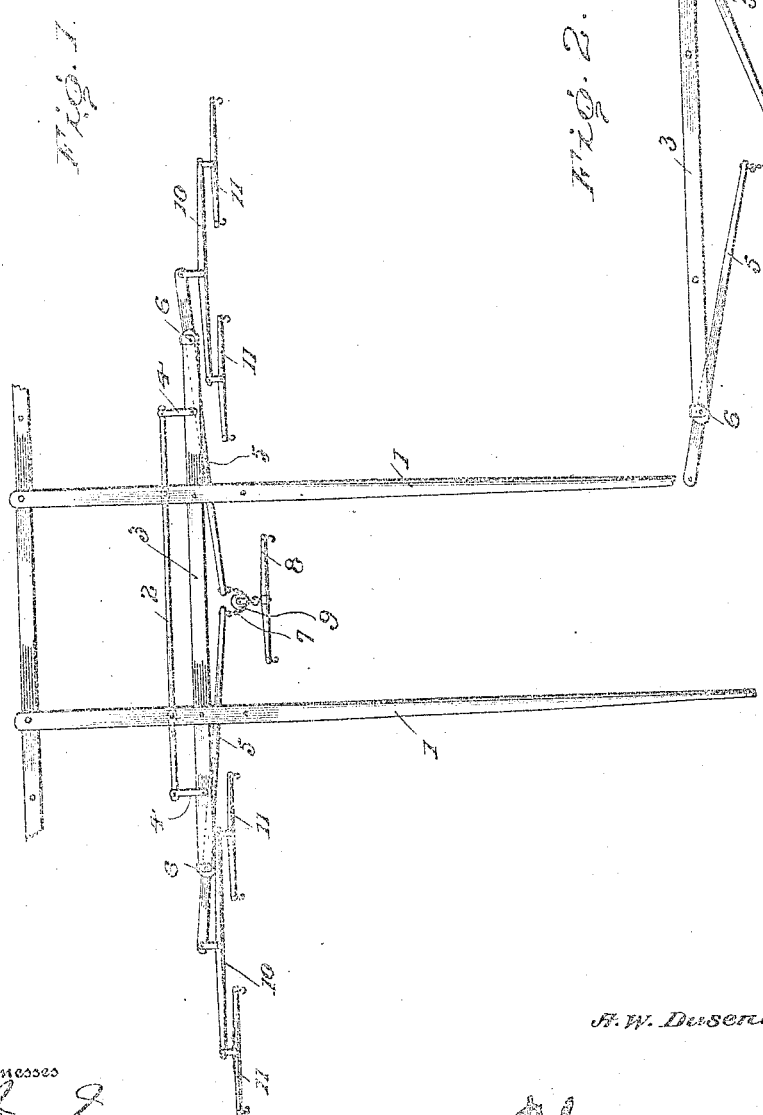

ALBERT W. DUSENBERY, OF IONIA, KANSAS.

DRAFT-EVENER.

No. 874,664.

Specification of Letters Patent.

Patented Dec. 24, 1907.

Application filed July 8, 1907. Serial No. 382,766.

*To all whom it may concern:*

Be it known that I, ALBERT W. DUSENBERY, citizen of the United States, residing at Ionia, in the county of Jewell and State of Kansas, have invented certain new and useful Improvements in Draft-Eveners, of which the following is a specification.

The present invention provides novel means for equalizing the draft of a team of five horses when hitched to a cultivator or like agricultural implement to be drawn over the field with the animals abreast.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of an evener for a team of five horses when arranged to work abreast. Fig. 2 is a detail view of the supporting timber, the equalizing levers attached thereto and the swingle-tree connected to the inner or opposing ends of said equalizing levers.

Transversely spaced longitudinal bars 1 are connected at their inner or rear ends to the cultivator or other implement or machine to be drawn in any accustomed way and correspond to thills or shafts between which a single draft animal is hitched so as to properly direct the implement or machine in its movement over the field or road. The bars, thills or shafts 1 have a rod or bar 2 and a timber 3 connected thereto in any suitable way, said parts 2 and 3 having a transverse and a parallel arrangement. The rod or bar 2 is located in the rear of the timber 3 and is considerably shorter than said timber and its end portions are connected by means of links 4 therewith. The rod or bar 2 may be of metal, whereas the part 3 is preferably of wood, although this is not essential.

Equalizing levers 5 have pivotal connection at 6 with the extremities of the timber 3 and their outer ends or arms are materially shorter than the inner arms, the ratio depending upon the power to be applied to opposite ends of said levers to effect equalization of the draft. A flexible connection 7 unites the inner ends of the equalizing levers and consists preferably of a short chain. A swingletree 8 provided with a sheaf pulley 9 is supported in the bite of the flexible connection 7 by means of said sheaf pulley, thereby admitting of the inner ends of the equalizing levers having a limited relative play incident to the jogging movement of the team when drawing the implement or machine over the field. A double-tree 10 is connected to the outer arm of each equalizing lever and is provided at its ends with swingle-trees 11. As shown in Fig. 1 the swingle-tree 8 occupies a central position and is arranged between the draft bars, thills or shafts 1, whereas the swingle-trees 11 are located exterior to said draft bars or thills, the several swingle-trees being in horizontal line to enable the draft animals to be arranged abreast. It is observed that the middle horse sustains the draft of the other four horses, two exerting a pulling force upon the outer extremity of the short arm of each equalizing lever. It will thus be understood that by reason of the advantage of the long leverage, the horse hitched to the swingle-tree 8 is enabled to pull his proportionate amount of the load. The flexible connection between the inner ends of the equalizing levers enables such levers to have independent movement, which, as is well known, is common when utilizing a team to pull a load.

Having thus described the invention, what is claimed as new is:

In a draft evener, the combination of transversely spaced longitudinal bars, a timber extended across said bars and connected thereto, a bar paralleling and spaced from said timber and similarly connected to said longitudinal bars and having its extremities terminating a distance from the extremities of the said timber and connected at its extremities thereto, equalizing levers pivoted to the extremities of the said timber to provide short and long arms, the latter extending inward, a flexible connection uniting the inner ends of said long arms, a swingle-tree having a sheave pulley supported in the bight of said flexible connection, and double-trees connected to the extremities of the short arms of said equalizing levers and provided with pairs of swingle-trees.

In testimony whereof I affix my signature in presence of two witnesses.

ALBERT W. DUSENBERY.

Witnesses:
BENJAMIN DIX,
B. L. POPPEN.